United States Patent [19]

Juntti

[11] Patent Number: 5,564,074
[45] Date of Patent: Oct. 8, 1996

[54] POWER CONTROL APPARATUS AND METHOD FOR A RADIOTELEPHONE

[75] Inventor: Juhani Juntti, Puuppola, Finland

[73] Assignee: Nokia Mobile Phones Ltd., Salo, Finland

[21] Appl. No.: 471,267

[22] Filed: Jun. 6, 1995

Related U.S. Application Data

[63] Continuation of Ser. No. 190,646, Feb. 2, 1994, abandoned.

[30]    Foreign Application Priority Data

Feb. 5, 1993 [FI] Finland ................................. 930515

[51] Int. Cl.⁶ .................................................. H04B 7/005
[52] U.S. Cl. ......................... 455/67.1; 455/54.1; 455/69
[58] Field of Search ................................ 455/33.1, 54.1, 455/68, 69, 70, 88, 67.1, 226.1, 226.2; 379/59, 60; 370/24, 29, 77; 375/200, 205

[56]            References Cited

U.S. PATENT DOCUMENTS

| | | | |
|---|---|---|---|
| 4,777,653 | 10/1988 | Bonnerot et al. | 455/69 |
| 4,811,421 | 3/1989 | Havel et al. | 455/70 |
| 5,129,098 | 7/1992 | McGirr et al. | 455/69 |
| 5,212,684 | 5/1993 | MacNamee et al. | 455/33.1 |
| 5,212,823 | 5/1993 | Fujii et al. | 455/54.1 |
| 5,265,119 | 11/1993 | Gilhousen et al. | 455/69 |
| 5,278,992 | 1/1994 | Su et al. | 455/67.1 |

FOREIGN PATENT DOCUMENTS

| | | |
|---|---|---|
| 0411756A2 | 2/1991 | European Pat. Off. . |
| 0462952A1 | 12/1991 | European Pat. Off. . |

Primary Examiner—Reinhard J. Eisenzopf
Assistant Examiner—Nguyen Vo
Attorney, Agent, or Firm—Perman & Green

[57]            ABSTRACT

A Time Division Duplex (TDD) communications system includes at least one base station having a first transmitter and a first receiver, and at least one radiotelephone having a second receiver for receiving a first radio frequency signal from the base station during a reception period and a second transmitter for transmitting a second radio frequency signal to the base station during a transmission period. The first radio frequency signal and the second radio frequency signal are characterized by having substantially the same center frequency and bandwidth. The radiotelephone further includes a signal measuring circuit having an input coupled to an output of the second receiver for measuring a signal level of a received first radio frequency signal during a reception period. The radiotelephone further includes a power control circuit coupled to an output of the signal measuring circuit for controlling, in accordance with the measured signal level, a level of the transmitted second radio frequency signal during a transmission period that occurs subsequent to the reception period. The TDD communications system is selected from one of a Time Division Duplex/Time Division Multiple Access system and a Time Division Duplex/Code Division Multiple Access system.

14 Claims, 3 Drawing Sheets

POWER CONTROL APPARATUS AND METHOD FOR A RADIOTELEPHONE

This is a continuation of application Ser. No. 08/190,646 filed on Feb. 2, 1994, now abandoned.

FIELD OF INVENTION

The present invention relates to transmit power control apparatus and method for a radiotelephone operable in a radiotelephone system utilising substantially the same centre frequency and bandwidth for both signal transmission and reception.

BACKGROUND TO INVENTION

In a cellular radio system based on time division multiple access (TDMA) or frequency division multiple access (FDMA), the control of transmit power is not necessary regarding the system operation. The first systems thus used the same transmit power all the time. In present cellular radiotelephone systems (e.g. NMT) control of the cellular radiotelephone power is used basically in order to save battery capacity. Power control is further used in small cells in order to reduce the noise level towards adjacent cells. However, usually there are only a few (about 5 to 10) usable power levels.

In a system based on code division multiple access (CDMA), in which the spectrum is spread with the DS technology (Direct Sequence), the power received by the base station from different cellular radiotelephones should be approximately equal, so that the system can accommodate as many users as possible. In the CDMA system the primary object of the power control is thus to maximize the capacity of the system. Then the power level must be controlled very accurately, and the transmit level must be minimized.

The transmit power can be controlled according to two different principles, either as open loop control or as closed loop control. In the open loop control the telephone measures the signal power received from the base station and then controls its transmit power accordingly. Generally the method does not, however, provide a good measurement accuracy, and thus it is neither possible to fully minimize the transmit power, so that it would not be inadvertently controlled too low due to the measurement inaccuracy. The reason for this is that the transmitted and received signals are differently attenuated, because they are situated at different frequencies. The difference can be 10 to 40 dB, depending on the radio signal's bandwidth and the propagation conditions. Thus the transmit power must be dimensioned to be sufficiently high, so that a reliable transmit link can be created. Open loop control is generally used in the present FDD/FDMA and FDD/TDMA systems (FDD, frequency division duplex), in which the transmit and reception is effected at different frequencies. The open loop control method is simple, but its disadvantage is the measurement inaccuracy of the method.

In the closed loop control system the signal power received from the cellular radiotelephone is measured at the base station and the control information required for the control of the transmit power is transmitted to the cellular radiotelephone. The disadvantage of the closed loop control method is that the method is more complicated than the open loop control, because in the closed loop system additional information must be transmitted separately and the transmit of control information in the cellular radio system requires a transmit rate of about 1 kbit/s so that the control system can operate correctly. A control system of this type is proposed to be used in FDD/CDMA systems.

BRIEF SUMMARY OF INVENTION

A first aspect of the present invention provides transmit power control apparatus for a radiotelephone operable in a radiotelephone system utilising substantially the same centre frequency and bandwidth for both signal transmission and reception, comprising signal measuring means (PH) for measuring a received signal level, and power control means for controlling the level of a corresponding subsequent transmitted signal (ITX) in accordance with the received signal level and a second aspect of the present invention provides a method of controlling transmit power for a radiotelephone operable in a radiotelephone system utilising substantially the same centre frequency and bandwidth for both transmission and reception, comprising measuring a received signal and controlling the level of a corresponding subsequently transmitted signal in accordance with the received signal level.

These have the advantage in that accurate power measurement and control can be achieved by simple circuitry and arrangements.

In single frequency TDD system, such as the DECT system, the signal is attenuated in the same way in both transmission directions. In the apparatus and method in accordance with the invention the transmit power is set in accordance with the signal level received in the latest time slot, because the control of an open loop is very accurate when transmission and reception is effected at the same frequency in consecutive time slots. Then the information about the changes in the signal caused by the changes is the most recent, whereby the transmit power can be minimized very accurately. Usually the transmit power is controlled about 20 dB higher than the required level, so that the signal certainly is sufficiently strong. It is possible to set the transmit power accurately to the minimum, or to control the signal to be only slightly higher than the required level because, according to the invention, the measurement and the power control can be made very accurately. Thanks to the invention it is possible to realize a radiotelephone system, which has the accuracy of the closed loop control method and the simple embodiment of the open loop control. The radiotelephone can be realized so that it contains a preset reference value with which the received signal power level is compared, and the transmitted signal is controlled according to this comparison. Alternatively it could be realized so that the transmitter identifies its absolute transmit power at the transmit time and e.g. only when the transmit power changes, so that no high data communication rate is required. The received signal power level is preferably measured during the whole reception time slot, and from this the power can be calculated, for instance by averaging.

Thus in the TDD system the signal is equally attenuated in both transmit directions, because the same frequency band is used in both directions (i.e. the same centre frequency and the same bandwidth). As the channel changes slightly as a function of time, the duplex time (the period of the transmit/reception time slot) must be sufficiently short, so that the change does not significantly influence the level of the signal, but accurate information about the received signal power level is obtained. The magnitude of the channel change depends e.g. by the fact whether the radiotelephone is moving or not (e.g. a car telephone).

DETAILED DESCRIPTION OF THE INVENTION

Figure 1:
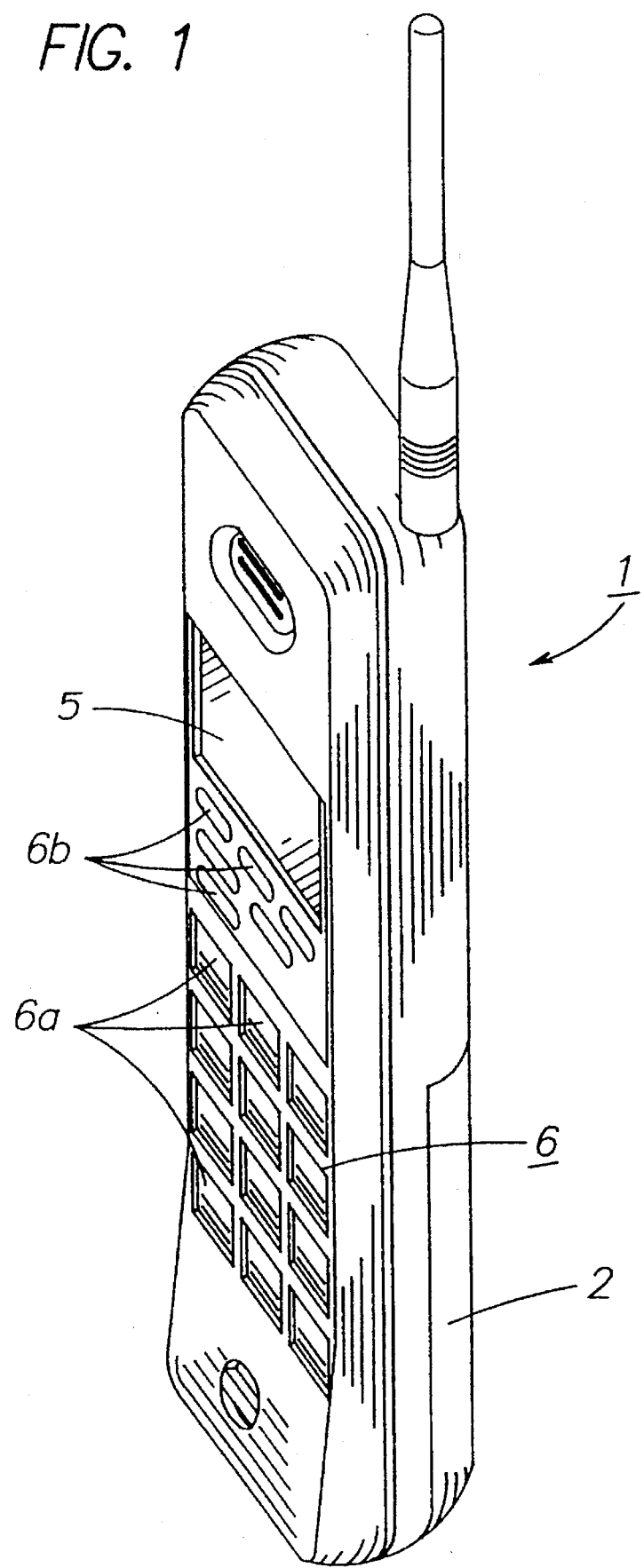
FIG. 1 shows a radiotelephone comprising the present invention.

The portable radiotelephone shown in FIG. 1 is a cellular telephone 1 powered by a rechargeable battery pack 2. The telephone 1 includes a transceiver and all the other features conventionally found in a cellular telephone. Since these aspects of the telephone are not directly relevant to the instant invention no further details will be given here, except to say that a single microprocessor 4 (see FIG. 2 and £) is employed to control all the basic functions of the telephone 1 and to control the keypad 6 and display 5 functions. Alternatively, however, the telephone functions may be controlled by a master microcomputer, while the keypad and display functions are under the control of a separate slave microcomputer coupled to communicate with the master microcomputer. Additionally, elements of the present invention may be implemented by the microprocessor.

Figure 2:
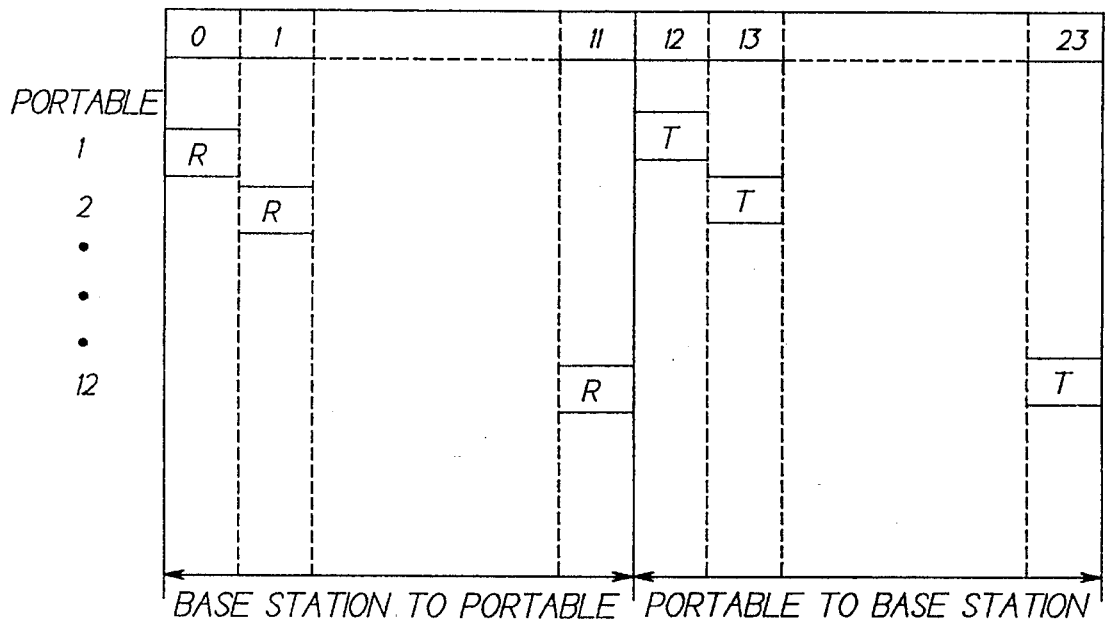
FIG. 2 shows the frame structure of the TDD/TDMA system, and an embodiment of the method according to the invention in the TDD/TDMA system.

FIG. 2 shows an embodiment of the method in accordance with the invention in the TDD/TDMA system, in which for example twelve radiotelephones communicate with the same base station. The first cellular radiotelephone measures the received signal level in the latest receive time slot 0, and it uses this information to control the transmit signal power immediately in the telephone's next transmit time slot 12. The second cellular radiotelephone correspondingly measures the received signal level in the latest receive time slot 1, and it uses this information to control the transmit signal power immediately in the telephone's next transmit time slot 13, and so on, whereby the last or twelfth cellular radiotelephone shown in FIG. 1 measures the received signal level in the latest receive time slot 11, and it uses this information to control the transmit signal power immediately in the telephone's next transmit time slot 23. The time slots 0 to 23 in FIG. 1 represent the fact that the base station processes the transmission and reception of each of the twelve radiotelephones in different time slots.

Figure 3:
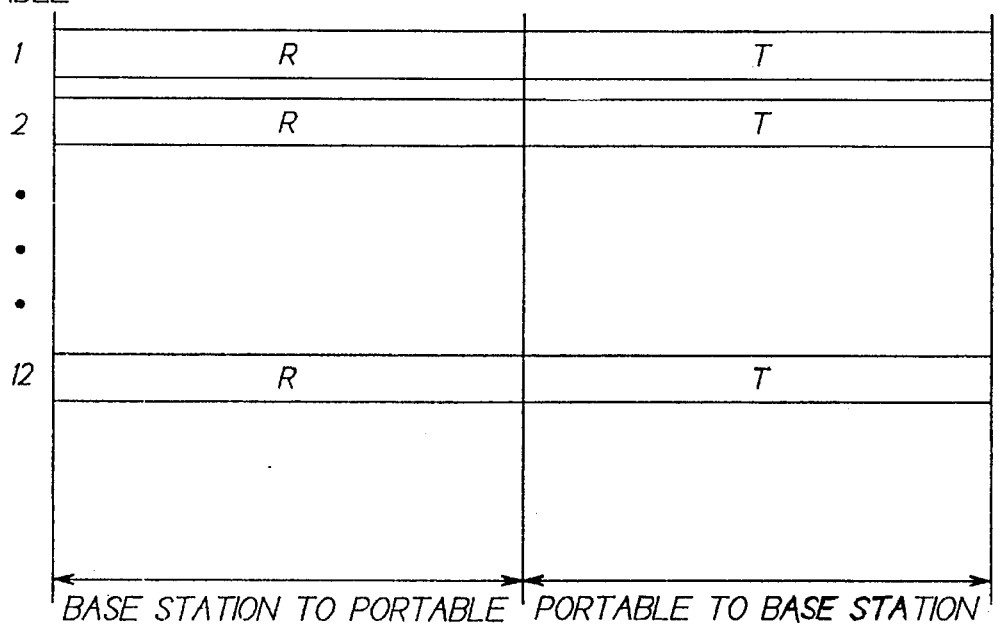
FIG. 3 shows the frame structure of the TDD/CDMA system, and an embodiment of the method according to the invention in the TDD/CDMA system.

FIG. 3 shows an embodiment of the method in accordance with the invention in the TDD/CDMA system, in which the transmission and reception is effected in different time slots. The cellular radiotelephones measure the level of the received signal R in the reception time slot and use this information to control the power of the transmit signal T in the transmit time slot. FIG. 3 shows how in the TDD/CDMA system the base station processes simultaneously the transmission and reception for all twelve radiotelephones. However, the transmission and reception are effected in different time slots to each other.

Figure 4:
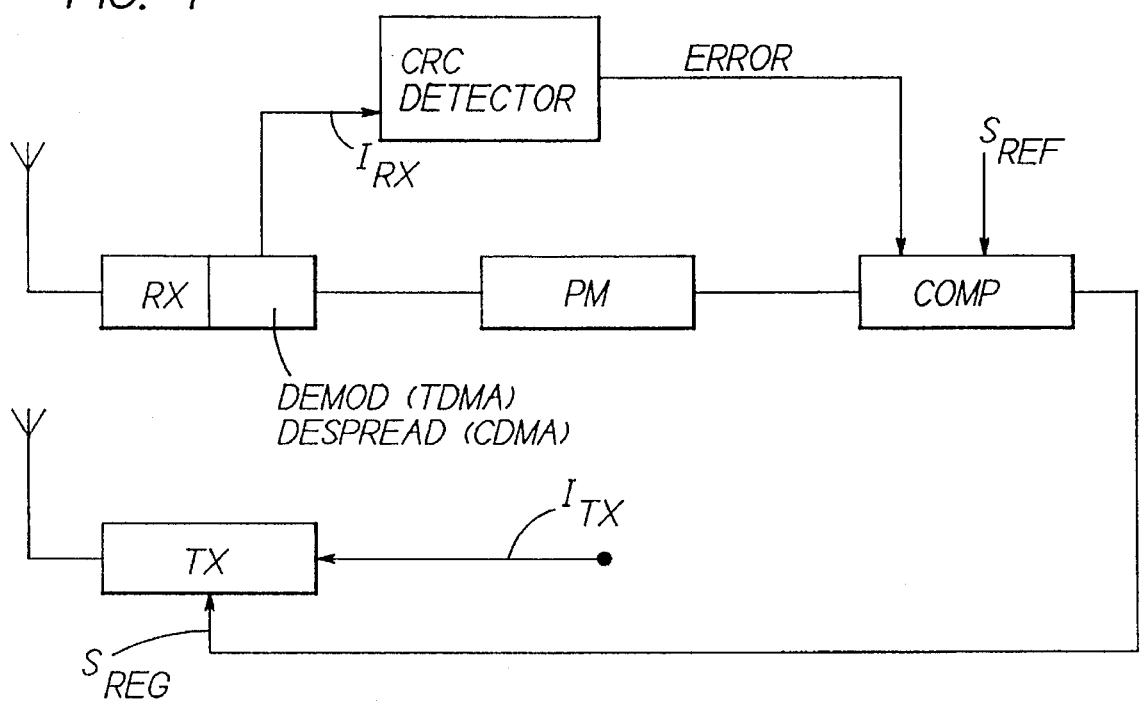
FIG. 4 shows a block diagram of a circuit for the power control of a radiotelephone in accordance with the invention.

FIG. 4 shows a radiotelephone diagram of a circuit block required for power control in accordance with the invention. The level of the information signal IRX arriving at the receiver RX is measured by the power measurement circuit PM. The second branch from the receiver RX represents the normal processing of the received information IRX in the radiotelephone, of which it is not necessary to present a more detailed block diagram in this connection as it is well known to a person skilled in the art. The level of the signal can be measured by measuring either its amplitude, power or the like by a convenient known method. The level of the received signal is preferably measured during the whole reception time slot, and from this the power can be calculated, e.g. by averaging. The measurement period must be selected to be sufficiently long so that the effect of any noise will be small due to the effects of averaging. However, the measurement period must also be short enough so that the data communication channel does not have time to change substantially during the measurement. The measurement result is compared with a reference value SREF, and the power of the transmitter TX is adjusted accordingly. The reference value SREF can be any preset reference value with which the level of the received signal IRX is compared in the comparison means COMP, and the level of the transmitted signal ITX is adjusted under the control of signal SREG according to this comparison. Alternatively the reference value SREF can be arranged to the comparison means so that the transmitter detects the absolute transmit power transmitted at the base station at the transmit time, and e.g. only when the transmit power changes, so that no high data communication rate is required.

A radiotelephone system in accordance with the invention provides the accuracy of the closed loop control method, even though no control information is transmitted from the base station to the cellular radiotelephone. With the method of the invention the transmit power of the cellular radiotelephone can be minimized and thus the power consumption is minimized. The interference of the cellular system also decreases because of lower transmit powers. There will also be a smaller distance for the repeated allocation of the same channel (i.e., the frequency band in FDMA, the code in CDMA and the time slot in TDMA), whereby the system can contain more users for each frequency unit and area unit. The number of users can be increased with dynamic channel allocation (DCA) due to the reduced interference obtained with the power control according to the invention. It is also possible to obviate the effects of fading by adjusting a suitable power level.

The method of the invention can be applied in a system using time division, in which also the transmit and reception is effected at the same frequency, e.g. in the TDD/CDMA or TDD/TDMA multiple access method. The power of a signal received in the CDMA system or in another spread spectrum system is measured when the signal has been despread (the signal is correlated by the spreading code). The invention is very advantageous in the CDMA system, where it is important that the signal received by the base station is approximately equally strong from all mobile stations. The signal power can be measured either from the RF signal, from the IF signal or from the demodulated signal (in the TDMA system).

In the DECT cellular radio system both the mobile station and the base station (transmitter and receiver) control their power levels independently. In the DECT system the speech packet is coded at the transmission (CRC, Cyclic Redundancy Check) in order to detect transmit errors at the reception. CRC is an error detection system, in which parity bits are generated by encoding, and the errors created during the transmission are detected by a decoding algorithm. When the receiver detects an erroneous speech packet, it requests repeated transmission, whereby the transmitter receives immediately in the next time slot information about a successful reception. Thus in the power control of the transmit signal it is possible to take into account the proportional ratio of successful transmissions in order to increase the success percentage, and at least in order to remove errors caused by the (too low) power level by using the power control method of invention.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What I claim is:

1. A radiotelephone, comprising:

a receiver for receiving a first radio frequency signal from a communication channel during a reception period;

a transmitter for transmitting a second radio frequency signal to the communication channel during a transmission period;

wherein said first radio frequency signal and said second radio frequency signal are characterized by having substantially the same center frequency and bandwidth; said radiotelephone further comprising:

signal measuring means having an input coupled to an output of said receiver for measuring a signal level of a received first radio frequency signal during the reception period;

means for detecting a presence of errors in blocks of digital data contained within the received first radio frequency signal; and power control means coupled to an output of said signal measuring means and to an output of said detecting means for controlling, in accordance with the measured signal level and also in accordance with a ratio of blocks received without error to blocks received with error, a level of the transmitted second radio frequency signal during a transmission period that occurs subsequent to the reception period, wherein the reception period corresponds to one time slot of a plurality of time slots transmitted to the communication channel from a transmitter of said first radio frequency signal, and the transmission period corresponds to another time slot;

wherein said signal measuring means measures the signal level of said received first radio frequency signal a plurality of times during the one time slot to provide a plurality of readings, and further comprises means for combining the plurality of readings to form the measured signal level.

2. A radiotelephone as set forth in claim 1, wherein said power control means includes means for comparing the measured signal level to a predetermined reference level, and wherein the level of the transmitted second radio frequency signal is controlled in accordance with a result of the comparison.

3. A radiotelephone as set forth in claim 1, wherein said receiver includes means for demodulating a received first radio frequency signal, and wherein said input of said signal measuring means is coupled to an output of said demodulating means.

4. A radiotelephone as set forth in claim 1, wherein said receiver includes means for despreading a received first radio frequency signal in accordance with a predetermined despreading code, and wherein said input of said signal measuring means is coupled to an output of said despreading means.

5. A radiotelephone as set forth in claim 1, wherein said radiotelephone operates in a radiotelephone system selected from one of a Time Division Duplex/Time Division Multiple Access system and a Time Division Duplex/Code Division Multiple Access system.

6. A radiotelephone, comprising:

a receiver for receiving a first radio frequency signal during a reception period;

a transmitter for transmitting a second radio frequency signal during a transmission period;

wherein said first radio frequency signal and said second radio frequency signal are characterized by having substantially the same center frequency and bandwidth; said radiotelephone further comprising:

signal measuring means having an input coupled to an output of said receiver for measuring a signal level of a received first radio frequency signal during the reception period;

means for detecting a presence of errors in blocks of digital data contained within the received first radio frequency signal; and power control means coupled to an output of said signal measuring means and to an output of said detecting means for controlling, in accordance with the measured signal level and also in accordance with a ratio of blocks received without error to blocks received with error, a level of the transmitted second radio frequency signal during a transmission period that occurs subsequent to the reception period, wherein a transmitter of said first radio frequency signal transmits said first radio frequency signal at one of a plurality of different power levels, wherein the transmitter of said first radio frequency signal transmits a message to said radiotelephone for informing said radiotelephone of which of the plurality of different power levels is in use, and wherein said power control means is responsive to a received message for controlling the level of the transmitted second radio frequency signal at least partially in accordance with the power level that is in use.

7. A method for operating a radiotelephone, comprising the steps of:

receiving a first radio frequency signal from a communication channel during a reception period;

transmitting a second radio frequency signal to the communication channel during a transmission period;

wherein the first radio frequency signal and the second radio frequency signal are characterized by having substantially the same center frequency and bandwidth; the method further comprising the steps of:

measuring a signal level of a received first radio frequency signal during the reception period;

detecting a presence of errors in blocks of digital data contained within the received first radio frequency signal; and controlling, in accordance with the measured signal level and also in accordance with a ratio of blocks received without error to blocks received with error, a level of the transmitted second radio frequency signal during a transmission period that occurs subsequent to the reception period, wherein the reception period corresponds to one time slot of a plurality of time slots transmitted to the communication channel from a transmitter of said first radio frequency signal, and the transmission period corresponds to another time slot;

wherein the step of measuring measures the signal level of the received first radio frequency signal a plurality of times during the one time slot to provide a plurality of readings, and further comprises a step of combining the plurality of readings to form the measured signal level.

8. A method as set forth in claim 7, wherein the step of controlling includes a step of comparing the measured signal level to a predetermined reference level, and wherein the level of the transmitted second radio frequency signal is controlled in accordance with a result of the comparison.

9. A method as set forth in claim 7, wherein the step of receiving includes a step of demodulating a received first radio frequency signal, and wherein the step of measuring measures the demodulated received signal.

10. A method as set forth in claim 7, wherein the step of receiving includes a step of despreading a received first radio frequency signal in accordance with a predetermined despreading code, and wherein the step of measuring measures the despread received signal.

11. A method as set forth in claim 7, wherein the radiotelephone operates in a radiotelephone system selected from one of a Time Division Duplex/Time Division Multiple Access system and a Time Division Duplex/Code Division Multiple Access system, and wherein the radiotelephone controls the level of the transmitted second radio frequency signal to have a minimum level that is consistent with an acceptable transmission error rate.

12. A method for operating a radiotelephone, comprising the steps of:

receiving a first radio frequency signal during a reception period;

transmitting a second radio frequency signal during a transmission period;

wherein the first radio frequency signal and the second radio frequency signal are characterized by having substantially the same center frequency and bandwidth; the method further comprising the steps of:

measuring a signal level of a received first radio frequency signal during the reception period;

detecting a presence of errors in blocks of digital data contained within the received first radio frequency signal; and controlling, in accordance with the measured signal level and also in accordance with a ratio of blocks received without error to blocks received with error, a level of the transmitted second radio frequency signal during a transmission period that occurs subsequent to the reception period, wherein a transmitter of the first radio frequency signal transmits the first radio frequency signal at one of a plurality of different power levels, wherein the transmitter of the first radio frequency signal transmits a message to the radiotelephone for informing the radiotelephone of which of the plurality of different power levels is in use, and wherein the step of controlling controls the level of the transmitted second radio frequency signal at least partially in accordance with the power level that is in use.

13. A Time Division Duplex communications system, comprising:

at least one base station comprising a first receiver and a first transmitter;

at least one radiotelephone comprising a second receiver for receiving over a communication channel a first radio frequency signal from the base station during a reception period and a second transmitter for transmitting over the communication channel a second radio frequency signal to the base station during a transmission period;

wherein said first radio frequency signal and said second radio frequency signal are characterized by having substantially the same center frequency and bandwidth; said radiotelephone further comprising:

signal measuring means having an input coupled to an output of said second receiver for measuring a signal level of a received first radio frequency signal during the reception period;

means for detecting a presence of errors in blocks of digital data contained within the received first radio frequency signal; and power control means coupled to an output of said signal measuring means and to an output of said detecting means for controlling, in accordance with the measured signal level and also in accordance with a ratio of blocks received without errors to blocks received with errors, numbers of detected errors in blocks of digital data, a level of the transmitted second radio frequency signal during a transmission period that occurs subsequent to the reception period, wherein the reception period corresponds to one time slot of a plurality of time slots transmitted to the communication channel from the first transmitter, and the transmission period corresponds to another time slot;

wherein said signal measuring means measures the signal level of said received first radio frequency signal a plurality of times during the one time slot to provide a plurality of readings, and further comprises means for combining the plurality of readings to form the measured signal level.

14. A Time Division Duplex communications system as set forth in claim 13, wherein said system is selected from one of a Time Division Duplex/Time Division Multiple Access system and a Time Division Duplex/Code Division Multiple Access system.

* * * * *